(12) United States Patent
Yang

(10) Patent No.: US 12,184,956 B2
(45) Date of Patent: Dec. 31, 2024

(54) COLOR-INFRARED SENSOR WITH A LOW POWER BINNING READOUT MODE

(71) Applicant: OMNIVISION TECHNOLOGIES, INC., Santa Clara, CA (US)

(72) Inventor: Zheng Yang, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 207 days.

(21) Appl. No.: 17/388,876

(22) Filed: Jul. 29, 2021

(65) Prior Publication Data

US 2023/0035728 A1 Feb. 2, 2023

(51) Int. Cl.
| | |
|---|---|
| *H04N 23/11* | (2023.01) |
| *H04N 23/84* | (2023.01) |
| *H04N 25/13* | (2023.01) |
| *H04N 25/131* | (2023.01) |
| *H04N 25/40* | (2023.01) |
| *H04N 25/44* | (2023.01) |
| *H04N 25/441* | (2023.01) |

(52) U.S. Cl.
CPC ............ *H04N 23/11* (2023.01); *H04N 23/84* (2023.01); *H04N 25/131* (2023.01); *H04N 25/135* (2023.01); *H04N 25/40* (2023.01); *H04N 25/44* (2023.01); *H04N 25/441* (2023.01)

(58) Field of Classification Search
CPC ...... H04N 23/11; H04N 23/84; H04N 25/131; H04N 25/135; H04N 25/40; H04N 25/44; H04N 25/441; H04N 25/443
USPC ........................................................ 348/164
See application file for complete search history.

(56) References Cited

U.S. PATENT DOCUMENTS

| | | | | |
|---|---|---|---|---|
| 2010/0315541 | A1* | 12/2010 | Egawa | H01L 27/14685 348/294 |
| 2014/0014817 | A1* | 1/2014 | Motonaga | H04N 25/75 250/208.1 |
| 2014/0104464 | A1* | 4/2014 | Spears | H04N 23/74 348/E9.002 |
| 2017/0150071 | A1* | 5/2017 | Otsubo | H01L 27/14645 |
| 2018/0070036 | A1* | 3/2018 | Centen | H04N 25/65 |
| 2018/0205895 | A1* | 7/2018 | Mitsunaga | H04N 7/181 |
| 2021/0014436 | A1* | 1/2021 | Nobuoka | H04N 25/53 |

* cited by examiner

*Primary Examiner* — Edemio Navas, Jr.
*Assistant Examiner* — Jimmy S Lee
(74) *Attorney, Agent, or Firm* — PERKINS COIE LLP

(57) ABSTRACT

An imaging device includes a pixel array including a 4×4 grouping of pixel circuits. The 4×4 grouping of pixel circuits includes four rows and four columns of the pixel array. A plurality of bitlines includes a first bitline, a second bitline, a third bitline, and a fourth bitline. Each one of the first, second, third, and fourth bitlines is coupled to a respective four pixel circuits in the 4×4 grouping of pixel circuits. Each one of the first, second, third, and fourth bitlines is coupled to all four of the rows and to all four of the columns of the 4×4 grouping of pixel circuits.

32 Claims, 9 Drawing Sheets

COLOR-INFRARED SENSOR WITH A LOW POWER BINNING READOUT MODE

BACKGROUND INFORMATION

Field of the Disclosure

This disclosure relates generally to image sensors, and in particular but not exclusively, relates to color image sensors with infrared sensitivity and pixel binning.

Background

Image sensors have become ubiquitous and are now widely used in digital cameras, cellular phones, security cameras as well as in medical, automotive, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing. The technology used to manufacture image sensors has continued to advance at a great pace. For example, the demands of higher resolution and lower power consumption have encouraged the further miniaturization and integration of these devices.

A typical complementary metal oxide semiconductor (CMOS) image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which are read out as analog signals from the column bitlines and converted to digital values to produce digital images (i.e., image data) that represent the external scene.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
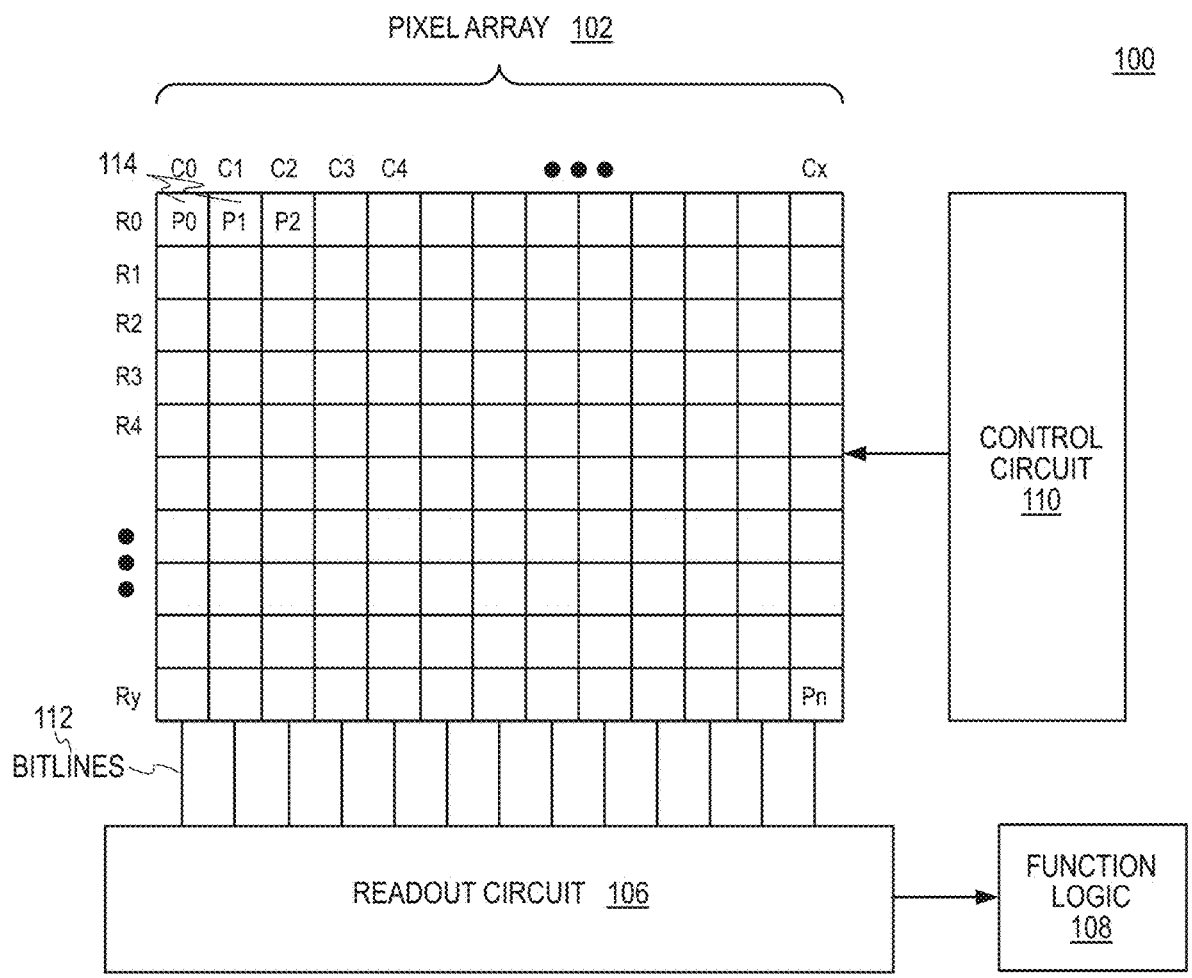
FIG. 1 illustrates one example of an imaging system with a pixel array including color and infrared pixels with a low power binning readout mode in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Examples directed to an imaging system with a pixel array including color and infrared pixels with a low power binning readout mode are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system with a pixel array including color and infrared pixels with a low power binning readout mode. In one example, the pixel array includes a 4×4 grouping of pixel circuits. The 4×4 grouping of pixel circuit includes four rows and four columns of the pixel array. The 4×4 grouping is one of a plurality of 4×4 groupings of pixel circuits that are included in the pixel array. A color filter array is disposed over the pixel array. In one example, the color filter array includes 4×4 groupings of color filters that are disposed over respective 4×4 groupings of the pixel circuits. In the example, each 4×4 grouping of color filters includes two color filters having a first color, eight color filters having a second color, two color filters having a third color, and four color filters having a fourth color. In one example, the first color is red (R), the second color is green (G), the third color is blue (B), and the fourth color is infrared (IR). As will be shown, the color filters are arranged in a pattern in the 4×4 groupings of color filters such that each one of the color filters of the 4×4 grouping of color filters is adjacent to another color filter having a different color in the same row and/or in the same column of the pixel array. In the examples, the imaging device also includes a plurality of bitlines. Each 4×4 grouping of pixel circuits is coupled to a first bitline, a second bitline, a third bitline, and a fourth bitline of the plurality of bitlines. As will be shown, each one of the first, second, third, and fourth bitlines is coupled to a respective four pixel circuits in the 4×4 grouping of pixel circuits. Each one of the first, second, third, and fourth bitlines is coupled to all four of the rows and to all four of the columns of the 4×4 grouping of pixel circuits. A readout circuit is coupled to the pixel array to read out the pixel array. The readout circuit includes a bitline switching circuit and analog to digital converters (ADCs) coupled to the bitline switching circuit. In a full resolution mode readout, four ADCs are configured to read out all pixel circuits in the 4×4 grouping of pixel circuits through the first, second, third, and fourth bitlines in four row readout periods. In a low power binning mode readout, two ADCs are configured to read out all pixel circuits in the 4×4 grouping of pixel circuits through the first, second, third, and fourth bitlines in two row readout periods.

To illustrate, FIG. 1 illustrates one example of an imaging system 100 with a pixel array including color and infrared pixels with a low power binning readout mode in accordance with the teachings of the present invention. In particular, imaging system 100 includes a pixel array 102, a control circuit 110, a readout circuit 106, and function logic 108. In one example, pixel array 102 is a two-dimensional (2D) array of pixel circuits 114, (e.g., P0, P1, . . . , Pn). As illustrated in the depicted example, the pixel circuits 114 are arranged into rows (e.g., R0, R1, . . . , Ry) and columns (e.g., C0, C1, . . . , Cy) in pixel array 102 to acquire image data or focus data of a person, place, object, etc., which can then be used to acquire and render a 2D image of the person, place, object, etc. As will be shown in the various examples below, a color filter array is disposed over the pixel array. In the various example, the color filter array may include red (R), green (G), blue (B), and infrared (IR) color filters that are arranged in a pattern over the pixel circuits 114 of the pixel array 102.

In the example, signals are read out from the pixel circuits 114 of pixel array 102 by readout circuit 106. The signals that are read out may be amplified, digitized, and then transferred to function logic 108. As such, in the various examples, the readout circuit 106 includes amplifiers, a bitline switching circuit, analog to digital converters (ADCs), etc., which are coupled to the bitlines 112. The function logic 108 may store the image data or even manipulate the image data by applying post image effects (e.g., crop, rotate, remove red eye, adjust brightness, adjust contrast, or otherwise).

As will be shown in the various examples, the pixel array 102 may be read out by readout circuit 106 in a full resolution mode readout or in a low power binning mode readout in accordance with the teachings of the present invention. In the full resolution mode readout, each pixel circuit 114 may be read out individually through respective bitlines 112 and digitized with ADCs that are coupled to each bitline. In the low power binning mode readout, multiple pixel circuits 114 that are disposed under color filters that are the same color may be read out simultaneously to provide a binned readout of the signals from the multiple pixel circuits 114. As a result, the number or row readout periods and the number ADCs required to read out all of the pixel circuits 114 of pixel array 102 is reduced in accordance with the teachings of the present invention. In the various examples, vertical binning may be performed when reading out pixel circuits 114 that are coupled to the same bitline 112 by using source follower binning, and horizontal binning may be performed by coupling multiple bitlines 112 to the same input of single ADC in readout circuit 106.

Figure 2:
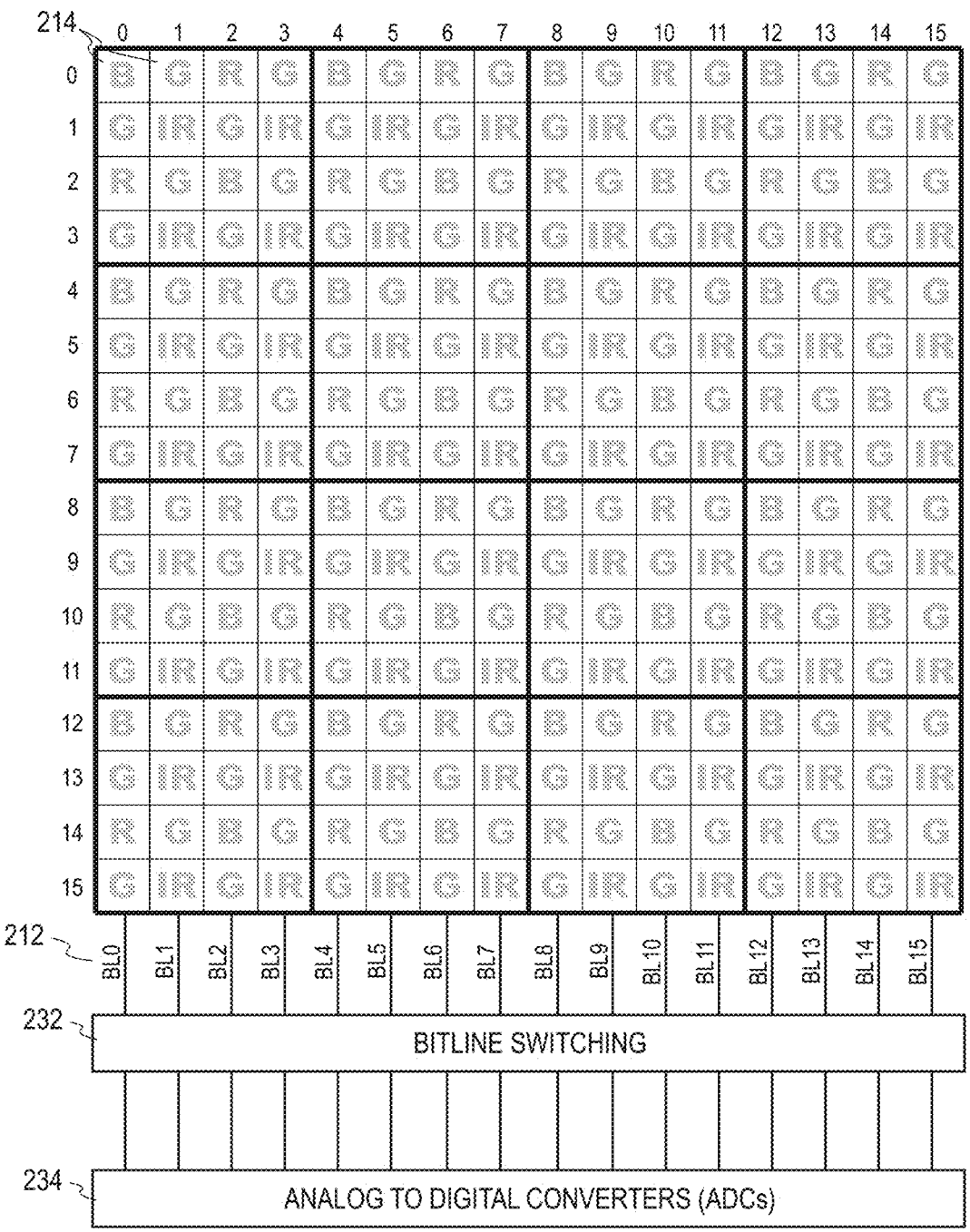
FIG. 2 illustrates greater detail of one example of a pixel array including 4×4 groupings of color and infrared pixels coupled to a readout circuit with a low power binning readout mode in accordance with the teachings of the present invention.

FIG. 2 illustrates greater detail of one example of a pixel array 202, which includes 4×4 groupings of color and infrared pixels coupled to a readout circuit with a low power binning readout mode in accordance with the teachings of the present invention. It is appreciated that the pixel array 202 of FIG. 2 may be an example showing greater detail of pixel array 102 as shown in FIG. 1, and that similarly named and numbered elements described above are coupled and function similarly below.

As shown in the example depicted in FIG. 2, pixel array 202 includes a plurality of pixel circuits 214 arranged into rows and columns in pixel array 202. In particular, the depicted examples shows that pixel array 202 includes plurality of 4×4 groupings of pixel circuits 214, which are indicated in FIG. 2 with the dark solid lines surrounding each of the 4×4 groupings of pixel circuits 214. Each of the 4×4 groupings of pixel circuits includes four rows and four columns of the pixel array. For instance, a first one of the 4×4 groupings of pixel circuits 214 includes rows 0-3 and columns 0-3 of pixel array 202, while a second one of the 4×4 groupings of pixel circuits 214 includes rows 0-3 and columns 4-7 of pixel array 202, and so on.

As shown in the depicted example, a bitline switching circuit 232 coupled to pixel array 202 through a plurality of bitlines 212. Analog to digital converters (ADCs) 234 are coupled to the bitlines 212 through bitline switching circuit 232 to convert analog signals received from bitlines 212 to digital signals. In one example, the bitline switching circuit 232 and ADCs 234 may be included in a readout circuit (e.g., readout circuit 106) to read out the signals from pixel array 202. As will be discussed, in various examples the pixel array 202 may be read with a full resolution mode readout or in a low power binning mode readout in accordance with the teachings of the present invention.

In one example, the plurality of bitlines 212 includes groupings of four bitlines that are coupled to respective 4×4 groupings of pixel circuits 214. For instance, in one example, bitlines BL0, BL1, BL2, and BL3 of the plurality of bitlines 212 are coupled to the 4×4 groupings of pixels circuits 214 that are included in columns 0-3 of pixel array 202. Similarly, bitlines BL4, BL5, BL6, and BL7 of the plurality of bitlines 212 are coupled to the 4×4 groupings of pixels circuits 214 that are included in columns 4-7 of pixel array 202. Bitlines BL8, BL9, BL10, and BL11 of the plurality of bitlines 212 are coupled to the 4×4 groupings of pixels circuits 214 that are included in columns 8-11 of pixel array 202. Bitlines BL12, BL13, BL14, and BL15 of the plurality of bitlines 212 are coupled to the 4×4 groupings of pixels circuits 214 that are included in columns 12-15 of pixel array 202. In other examples, it is appreciated that pixel array 202 may include a greater number of 4×4 groupings of pixel circuits 212, and that the 16 columns of pixel circuits 214 illustrated in the example pixel array 202 of FIG. 2 is provided for explanation purposes.

The example illustrated in FIG. 2 also illustrates that a color filter array is disposed over the pixel circuits 214 of pixel array 202. In the example, the color filter array includes 4×4 groupings of color filters that are disposed over respective 4×4 groupings of pixel circuits 214. In the example, the color filter array includes color filters having four different colors that are arranged in a mosaic pattern over the 4×4 groupings of pixel circuits 214. The four colors depicted in FIG. 2 include red (R), green (G), blue (B), and infrared (IR). It is appreciated that in other examples, other colors may be used for the color filter array.

As shown in the example depicted in FIG. 2, the odd row numbers (e.g., row 1, row 3, etc.) of the 4×4 groupings of pixel circuits 214 are disposed under color filters that are arranged in a pattern of green (G), infrared (IR), green (G), and infrared (IR) color filters. The even row numbers (e.g., row 0, row 2, etc.) of the 4×4 groupings of pixel circuits 214 are disposed under color filters that are arranged in a pattern of blue (B), green (G), blue (B), and green (G) or red (R), green (G), red (R), and green (G) color filters as shown.

As such, it is appreciated that each 4×4 grouping of pixel circuits 214 in the example shown in FIG. 2 is disposed under a 4×4 grouping of color filters that are arranged to include two blue (R) color filters, eight green (G) color filters, two blue (B) color filters, and four infrared (IR) color filters. In addition, each one of the color filters is arranged to be adjacent to another color filter that is a different color in the same row or in the same column of the pixel array 202 such that no two adjacent color filters in the same row column or in the same column are the same color.

Figure 3:
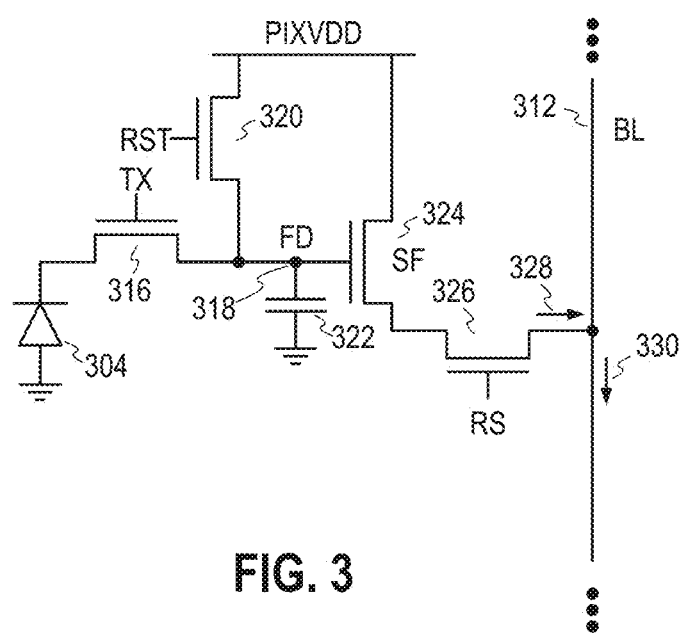
FIG. 3 illustrates an example schematic of one of the pixel circuits included one example of a pixel array including color and infrared pixels in accordance with the teachings of the present invention.

FIG. 3 illustrates one example of a pixel circuit 314 included in an example pixel array that includes 4×4 groupings of color and infrared pixels in accordance with the teachings of the present invention. It is appreciated the pixel circuit 314 of FIG. 3 may be an example of one of the pixel circuits 214 included in pixel array 202 as shown in FIG. 2, or an example of one of the pixel circuits 114 included in pixel array 102 as shown in FIG. 1, and that similarly named and numbered elements described above are coupled and function similarly below.

In the example depicted in FIG. 3, pixel circuit 314 includes a photodiode 304 that is coupled to a transfer transistor 316. In the various examples, photodiode 304 is configured to be illuminated through one of the color filters of a color filter array as discussed in FIG. 2. As such, photodiode 304 is configured to photogenerate charge in response to incident red (R) light, green (G) light, blue (B) light, or infrared (IR) light. In the example, a floating diffusion 318 is coupled to transfer transistor 316. In one example, a floating diffusion capacitor 322 is coupled to the floating diffusion 318 as shown. In operation, transfer transistor 316 is coupled to be controlled in response to a transfer control signal TX. As such, charge photogenerated in photodiode 304 in response to incident light is transferred to floating diffusion 318 in response to transfer control signal TX.

Continuing with the example depicted in FIG. 3, a reset transistor 320 is coupled between a voltage supply (e.g., PIXVDD) and the floating diffusion 318. In operation, the reset transistor 320 is configured to reset pixel circuit 314 including the charge in floating diffusion 318 in response to a reset control signal RST.

As shown in the depicted example, a gate of a source follower transistor 324 is coupled to the floating diffusion 318. In the example, the drain of the source follower transistor 324 is coupled to the voltage supply (e.g., PIXVDD), and the source of source follower transistor 324 is coupled to a bitline BL 312. In the depicted example, a row select transistor 326 is coupled to source follower transistor 324 such that the source follower transistor 324 and the row select transistor 326 are coupled between the voltage supply (e.g., PIXVDD) and the bitline BL 312.

In operation, when pixel circuit 314 is read out, the row select transistor 326 is turned on in response to a row select signal RS to generate an output signal 328 that is generated by the source follower transistor 324 in response to charge in the floating diffusion 318. The output signal 328 is coupled to bitline BL 312, and is therefore combined with or vertically binned with any other output signals 328 from other pixels 314 that may be coupled to bitline BL 312 at the same time to generate a total output signal 330 as shown. In a full resolution mode readout, only one pixel 314 would be read out at a time through bitline BL 312 such that total output signal 330 is the same is output signal 328 from an individual pixel circuit 314. In a low power binning mode readout, a plurality of pixel circuits 314 that are coupled to bitline BL 312 are read out simultaneously, and total output signal 330 would be equal to the average of all of the output signals 328 from the pixel circuits 314 that are being read out at that time.

Figure 4:
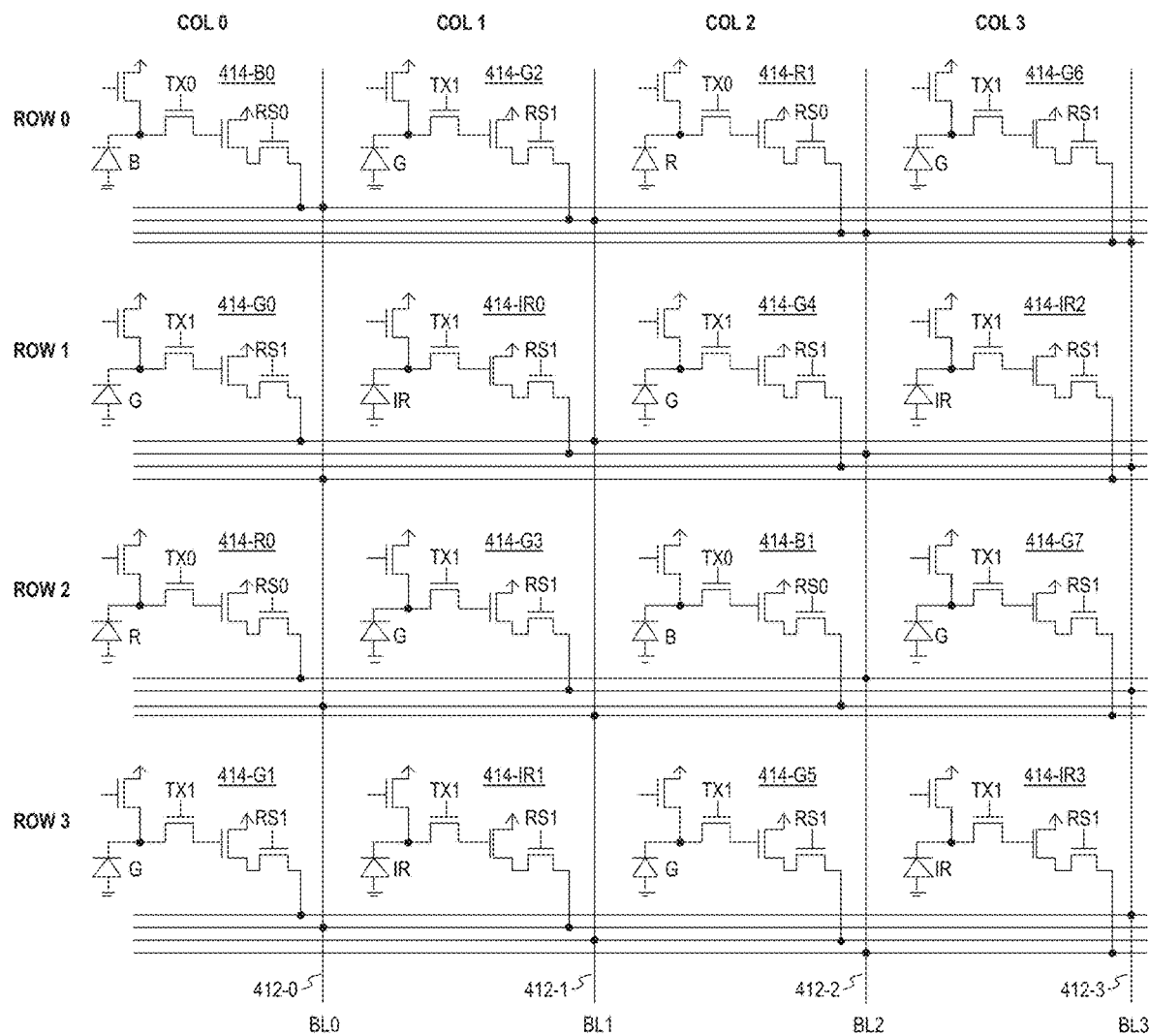
FIG. 4 illustrates one example arrangement of a 4×4 grouping of pixel circuits coupled to four bitlines included in one example of a pixel array including color and infrared pixels coupled to a readout circuit with a low power binning readout mode in accordance with the teachings of the present invention.

FIG. 4 illustrates one example arrangement of a 4×4 grouping of pixel circuits coupled to four bitlines included in one example of a pixel array 402 including color and infrared pixels coupled to a readout circuit with a low power binning readout mode in accordance with the teachings of the present invention. It is appreciated that the 4×4 grouping of pixel circuits illustrated FIG. 4 may be an example showing greater detail of the 4×4 grouping of pixel circuits 214 in rows 0-3 and columns 0-3 shown in the upper left hand corner of pixel array 204 of FIG. 2, and that similarly named and numbered elements described above are coupled and function similarly below. It is further appreciated that the pixel circuits illustrated in the example pixel array 402 of FIG. 4 may be examples of the pixel circuit 314 described in detail in FIG. 3, and therefore not described in detail again in with respect to FIG. 4 for the sake of brevity.

As shown in the example of FIG. 4, pixel array 402 includes a 4×4 grouping of pixel circuits including four rows (e.g., rows 0-3) and four columns (e.g., rows). Specifically, the example depicted in FIG. 4 shows that pixel circuit 414-B0 at row 0 column 0 includes a photodiode configured to be illuminated with blue (B) light, pixel circuit 414-G2 at row 0 column 1 includes a photodiode configured to be illuminated with green (G) light, pixel circuit 414-R1 at row 0 column 2 includes a photodiode configured to be illuminated with red (R) light, and pixel circuit 414-G6 at row 0 column 3 includes a photodiode configured to be illuminated with green (G) light.

Pixel circuit 414-G0 at row 1 column 0 includes a photodiode configured to be illuminated with green (G) light, pixel circuit 414-IR0 at row 1 column 1 includes a photodiode configured to be illuminated with infrared (IR) light, pixel circuit 414-G4 at row 1 column 2 includes a photodiode configured to be illuminated with green (G) light, and pixel circuit 414-IR2 at row 1 column 3 includes a photodiode configured to be illuminated with infrared (IR) light.

Pixel circuit 414-R0 at row 2 column 0 includes a photodiode configured to be illuminated with red (R) light, pixel circuit 414-G3 at row 2 column 1 includes a photodiode configured to be illuminated with green (G) light, pixel circuit 414-B1 at row 2 column 2 includes a photodiode configured to be illuminated with blue (B) light, and pixel circuit 414-G7 at row 2 column 3 includes a photodiode configured to be illuminated with green (G) light.

Pixel circuit 414-G1 at row 3 column 0 includes a photodiode configured to be illuminated with green (G) light, pixel circuit 414-IR1 at row 3 column 1 includes a photodiode configured to be illuminated with infrared (IR) light, pixel circuit 414-G5 at row 3 column 2 includes a photodiode configured to be illuminated with green (G) light, and pixel circuit 414-IR3 at row 3 column 3 includes a photodiode configured to be illuminated with infrared (IR) light.

The depicted example also illustrates four bitlines that are coupled to the 4×4 grouping of pixel circuits included in FIG. 4. The four bitlines include bitline BL0 412-0, bitline BL1 412-1, bitline BL2 412-2, and bitline BL3 412-3. As shown, each one of the bitline BL0 412-0, bitline BL1 412-1, bitline BL2 412-2, and bitline BL3 412-3 is coupled to a respective four pixel circuits in the 4×4 grouping of pixel circuits. Furthermore, each one of the bitlines BL0 412-0, BL1 412-1, BL2 412-2, and BL3 412-3 is coupled to all four of the rows and to all four of the columns of the 4×4 grouping of pixel circuits. In other words, each one of the bitlines BL0 412-0, BL1 412-1, BL2 412-2, and BL3 412-3 is coupled to respective pixel circuits in all of the rows (e.g., rows 0-3) and in all of the columns (e.g., columns 0-3) of the 4×4 grouping of pixel circuits in accordance with the teachings of the present invention.

In one example, it is appreciated that each of the four bitlines BL0 412-0, BL1 412-1, BL2 412-2, and BL3 412-3 can be coupled to every row and every column of the 4×4 grouping of pixel circuits by being coupled to pixel circuits along diagonals of the 4×4 grouping of pixel circuits in the 4×4 grouping of pixel circuits. For instance, the example depicted in FIG. 4 shows that bitline BL0 412-0 is coupled to pixel circuits included along the diagonals that include pixel circuit 414-B0 in row 0 column 0, pixel circuit 414-IR2 in row 1 column 3, pixel circuit 414-B1 in row 2 column 2, and pixel circuit 414-IR1 in row 3 column 1. Bitline BL1 412-1 is coupled to pixel circuits included along the diagonals that include pixel circuit 414-G2 in row 0 column 1, pixel circuit 414-G0 in row 1 column 0, pixel circuit 414-G7 in row 2 column 3, and pixel circuit 414-G5 in row 3 column 2. Bitline BL2 412-2 is coupled to pixel circuits included along the diagonals that include pixel circuit 414-R1 in row 0 column 2, pixel circuit 414-IR0 in row 1 column 1, pixel circuit 414-R0 in row 2 column 0, and pixel circuit 414-IR3 in row 3 column 3. Bitline BL3 412-3 is coupled to pixel circuits included along the diagonal that includes pixel circuit 414-G6 in row 0 column 3, pixel circuit 414-G4 in row 1 column 2, pixel circuit 414-G3 in row 2 column 1, and pixel circuit 414-G1 in row 3 column 0.

FIGS. 5A-5D illustrate examples showing greater detail of a first bitline BL0 512-0, a second bitline BL1 512-1, a third bitline BL2 512-2, and a fourth bitline BL3 512-3 coupled to respective four pixel circuits of a 4×4 grouping of pixel circuits in accordance with the teachings of the present invention. It is appreciated that the first bitline BL0 512-0, a second bitline BL1 512-1, a third bitline BL2 512-2, and a fourth bitline BL3 512-3, and the respective four pixel circuits coupled them, as illustrated in FIGS. 5A-5D may be examples of the first bitline BL0 412-0, second bitline BL1 412-1, third bitline BL2 412-2, and fourth bitline BL3 412-3, and the respective four pixel circuits coupled them, as shown in FIG. 4, and that similarly named and numbered elements described above are coupled and function similarly below.

It is further appreciated that the pixel circuits illustrated in FIGS. 5A-5D may also be examples of pixel circuit 314 as illustrated in FIG. 3. As such, each pixel circuit in FIGS. 5A-5D includes a photodiode 504 is configured to photogenerate charge in response to incident red (R) light, green (G) light, blue (B) light, or infrared (IR) light. A floating diffusion 518 is coupled to transfer transistor 516, and in one example, a floating diffusion capacitor 522 is coupled to the floating diffusion 518 as shown. The transfer transistor 516 is coupled to be controlled in response to a transfer control signal (e.g., TX0 or TX1) to transfer charge photogenerated in photodiode 504 to floating diffusion 518. A reset transistor 520 is coupled between a voltage supply (e.g., PIXVDD) and the floating diffusion 518. The reset transistor 520 is configured to reset the respective pixel circuit in response to a reset control signal RST. A gate of a source follower transistor 524 is coupled to the floating diffusion 518. The drain of the source follower transistor 524 is coupled to the voltage supply (e.g., PIXVDD), and the source of source follower transistor 524 is coupled to the respective bitline (e.g., BL0 512-0, BL1 512-1, BL2 512-2, or BL3 512-3). A row select transistor 526 is coupled to source follower transistor 524 such that the source follower transistor 524 and the row select transistor 526 are coupled between the voltage supply (e.g., PIXVDD) and the bitline BL 512. The row select transistor 526 is turn on in response to a row select signal (e.g., RS0 or RS1) to couple the respective output signal 528 to the bitline 512.

Figure 5A:
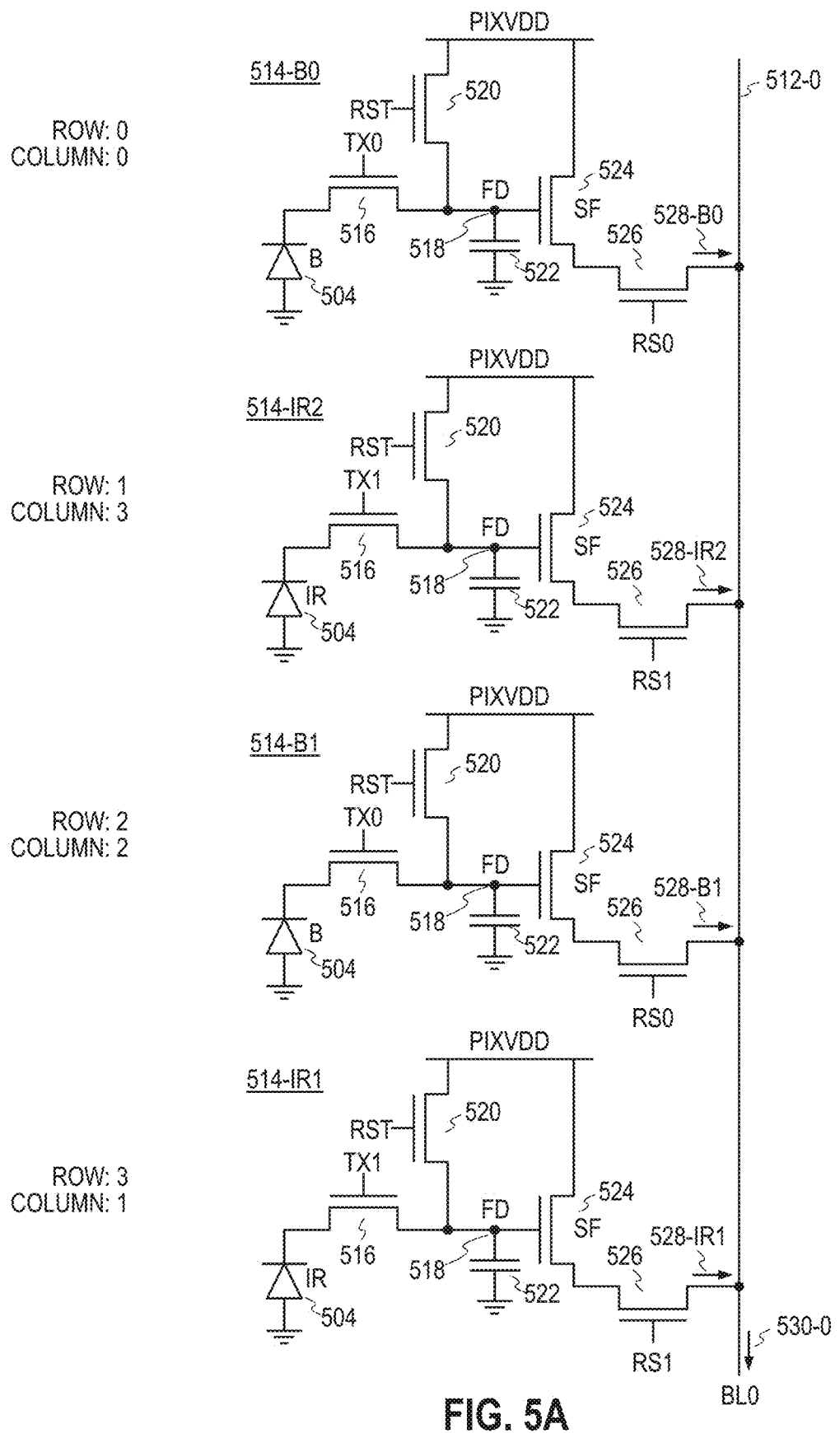
FIG. 5A illustrates one example of a first bitline coupled to four pixel circuits of a 4×4 grouping of pixel circuits coupled to four bitlines included in one example of a pixel array including color and infrared pixels coupled to a readout circuit with a low power binning readout mode in accordance with the teachings of the present invention.

Referring now specifically to the example depicted in FIG. 5A, first bitline BL0 512-0 is coupled to the pixel circuit 514-B0 of row 0 column 0, which is configured to be illuminated with blue (B) light through a blue (B) color filter, pixel circuit 514-IR2 of row 1 column 3, which is configured to be illuminated with infrared (IR) light through an infrared (IR) color filter, pixel circuit 514-B1 of row 2 column 2, which is configured to be illuminated with blue (B) light through a blue (B) color filter, and pixel circuit 514-IR1, which is configured to be illuminated with infrared (IR) light through an infrared (IR) color filter. Therefore, it is appreciated that first bitline BL0 512-0 is coupled to four pixel circuits, two of which are illuminated with blue (B) light and two of which are illuminated with infrared (IR) light.

In one example, during a full resolution mode readout of the pixel array, output signal 528-B0 may be read out from pixel circuit 514-B0 of row 0 column 0 through bitline BL0 512-0 via total output signal 530-0 during a first row readout period. During a second row readout period of the full resolution readout, output signal 528-IR2 may be read out from pixel circuit 514-IR2 of row 1 column 3 through bitline BL0 512-0 via total output signal 530-0. During a third row readout period of the full resolution readout, output signal 528-B1 may be read out from pixel circuit 514-B1 of row 2 column 2 through bitline BL0 512-0 via total output signal 530-0. During a fourth row readout period of the full resolution readout, output signal 528-IR1 may be read out from pixel circuit 514-IR1 of row 3 column 1 through bitline BL0 512-0 via total output signal 530-0. Therefore, it is appreciated that all four of the pixel circuits coupled to bitline BL0 512-0 may be read out in four row readout periods during a full resolution mode readout of the pixel array.

In one example, during a low power binning mode readout of the pixel array, output signal 528-B0 from pixel circuit 514-B0 of row 0 column 0 and output signal 528-B1 from pixel circuit 514-B1 of row 2 column 2 may be read out simultaneously through bitline BL0 512-0 via total output signal 530-0 during a first row readout period. As such, both blue (B) signals 528-B1 and 528-B0 can be combined or binned and read out in the same row readout period via output signal 530-0. It is appreciated that by reading out the output signals 528-B0 and 528-B1 simultaneously, vertical binning is realized in accordance with the teachings of the present invention. For purposes of this disclosure, it is appreciated that the term "vertical" binning applies to multiple output signals (e.g., output signals 528-B0 and 528-B1) being received simultaneously from multiple pixel circuits (e.g., pixel circuit 514-B0 and 514-B1) on the same individual bitline (e.g., bitline BL0 512-0). In other words, even though pixel circuit 514-B0 and pixel circuit 514-B1 are physically arranged in different columns (e.g., column 0 and column 2) of the 4×4 grouping of pixel circuits, both pixel circuit 514-B0 and pixel circuit 514-B1 are schematically coupled to the same bitline (e.g., bitline BL0 512) to realize "vertical" binning for purposes of this disclosure when both output signals 528-B0 and 528-B1 are read out simultaneously by bitline BL0 512. As illustrated in the example depicted in FIG. 4, both output signals 528-B0 and 528-B1 may be read out simultaneously from pixel circuit 514-B0 and pixel circuit 514-B1 in response to assertions of transfer control signal TX0, transfer control signal TX1, and row select signal RS0. In addition, by reading out both output signals 528-B0 and 528-B1 simultaneously in one row readout period, fewer row readout periods are required, which improves speed and power consumption in accordance with the teachings of the present invention.

Continuing with the example depicted in FIG. 5A, during a second row readout period of the low power binning mode readout of the pixel array, output signal 528-IR2 from pixel circuit 514-IR2 of row 1 column 3 and output signal 528-IR1 from pixel circuit 514-IR1 of row 3 column 1 may be read out simultaneously through bitline BL0 512-0 via total output signal 530-0. Even though pixel circuit 514-IR2 and pixel circuit 514-IR1 are physically arranged in different columns (e.g., column 3 and column 1) of the 4×4 grouping of pixel circuits, both pixel circuit 514-IR1 and pixel circuit 514-IR1 are schematically coupled to the same bitline (e.g., bitline BL0 512) to realize "vertical" binning for purposes of this disclosure when both output signals 528-IR2 and 528-IR1 are read out simultaneously by bitline BL0 512. As illustrated in the example depicted in FIG. 4, both output signals 528-IR2 and 528-IR1 may be read out simultaneously from pixel circuit 514-IR2 and pixel circuit 514-IR1 in response to assertions of transfer control signal TX1 and row select signal RS1. Therefore, it is appreciated that all four of the pixel circuits coupled to bitline BL0 512-0 may be read out in two row readout periods during a low power binning mode readout of the pixel array.

As will be described in greater detail below, in addition to the vertical binning provided by reading out the output signals 528-IR2 and 528-IR1 simultaneously from first bitline BL0 512-0, in one embodiment, additional horizontal binning may be further achieved during the second row readout period by reading out the two other infrared signals (e.g., 528-IR0 and 528-IR3) at the same, which are coupled to third bitline BL2 512-2, which will be discussed below in FIG. 5C. Thus, for purposes of this disclosure, it is appreciated that the term "horizontal" binning applies to multiple output signals (e.g., output signals 528-IR2/528-IR1 and output signals 528-IR0/528-IR3) being received simultaneously from multiple bitlines (e.g., bitline BL0 512-0 and bitline BL2 512-2) even though the pixel circuits that are being read out at the same time may or may not necessarily be arranged physically in the same rows of the 4×4 grouping of pixel circuits. In the example, both the first bitline BL0 512-0 and third bitline BL2 512-2 are coupled to the input of the same analog to digital converter through a bitline switching circuit in accordance with the teachings of the present invention. As such, all four infrared (IR) signals can be vertically binned and horizontally binned simultaneously, and read out in the same row readout period in accordance with the teachings of the present invention.

Figure 5B:
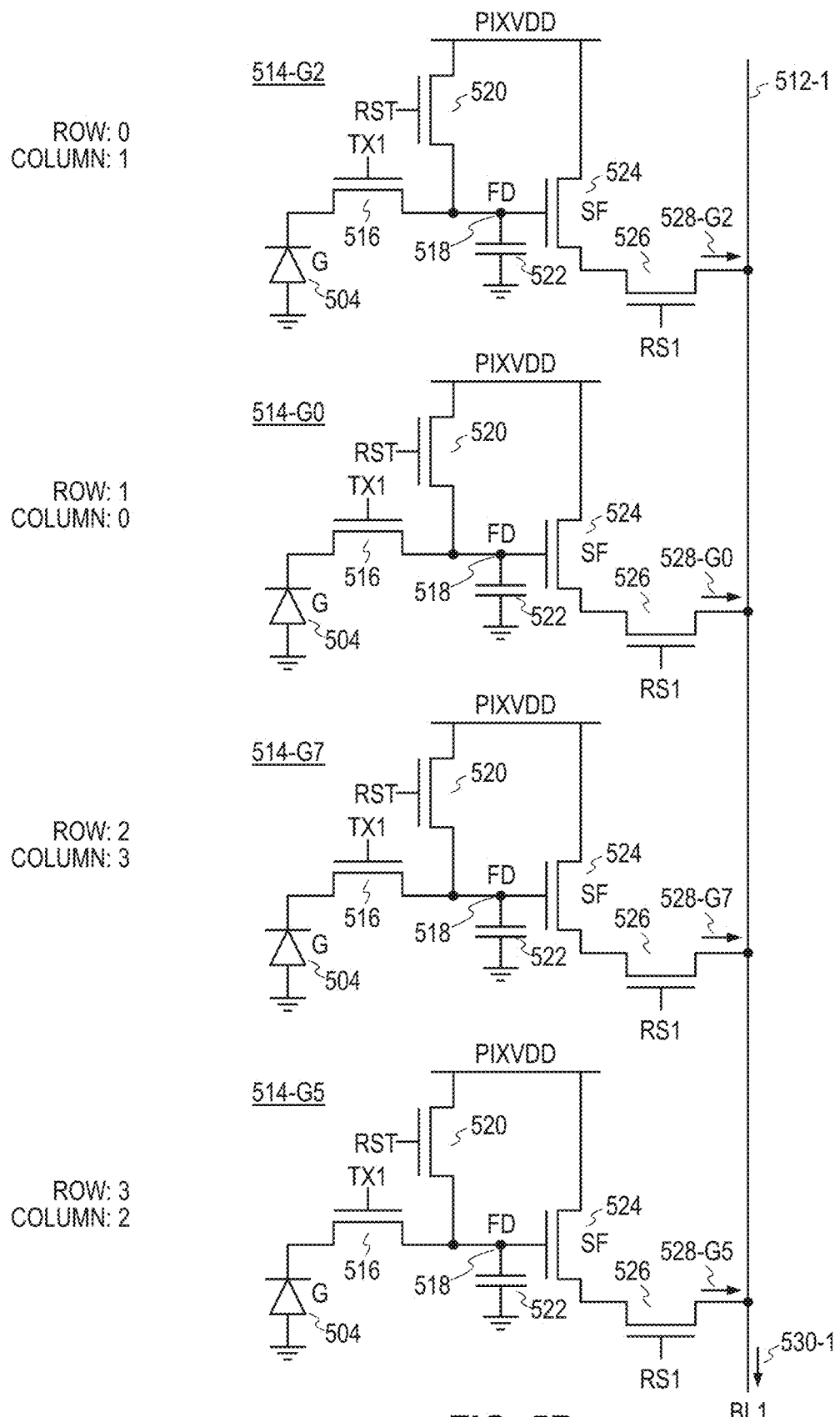
FIG. 5B illustrates one example of a second bitline coupled to four pixel circuits of a 4×4 grouping of pixel circuits coupled to four bitlines included in one example of a pixel array including color and infrared pixels coupled to a readout circuit with a low power binning readout mode in accordance with the teachings of the present invention.

Referring now specifically to the example depicted in FIG. 5B, second bitline BL1 512-1 is coupled to the pixel circuit 514-G2 of row 0 column 1, which is configured to be illuminated with green (G) light through a green (G) color filter, pixel circuit 514-G0 of row 1 column 0, which is configured to be illuminated with green (G) light through an green (G) color filter, pixel circuit 514-G7 of row 2 column 3, which is configured to be illuminated with green (G) light through a green (G) color filter, and pixel circuit 514-G5, which is configured to be illuminated with green (G) light through a green (G) color filter. Therefore, it is appreciated that second bitline BL1 512-1 is coupled to four pixel circuits, all four of which are illuminated with green (G) light.

In one example, during a full resolution mode readout of the pixel array, output signal 528-G2 may be read out from pixel circuit 514-G2 of row 0 column 1 through bitline BL1 512-1 via total output signal 530-1 during a first row readout period. During a second row readout period of the full resolution readout, output signal 528-G0 may be read out from pixel circuit 514-G0 of row 1 column 0 through bitline BL1 512-1 via total output signal 530-1. During a third row readout period of the full resolution readout, output signal 528-G7 may be read out from pixel circuit 514-G7 of row 2 column 3 through bitline BL1 512-1 via total output signal 530-1. During a fourth row readout period of the full resolution readout, output signal 528-G5 may be read out from pixel circuit 514-G5 of row 3 column 2 through bitline BL1 512-1 via total output signal 530-1. Therefore, it is appreciated that all four of the pixel circuits coupled to bitline BL0 512-1 may be read out in four row readout periods during a full resolution mode readout of the pixel array.

In one example, during a low power binning mode readout of the pixel array, output signal 528-G2 from pixel circuit 514-G2 of row 0 column 1, output signal 528-G0 from pixel circuit 514-G0 of row 1 column 0, output signal 528-G7 from pixel circuit 514-G7 of row 2 column 3, and output signal 528-G5 from pixel circuit 514-G5 of row 3 column 2 may be read out simultaneously through bitline BL1 512-1 via total output signal 530-1 during a single row readout period. As such, all four green (G) signals 528-G2, 528-G0, 528-G7, and 528-G5 that are coupled to bitline BL1 512-1 can be combined or binned and read out in the same row readout period via total output signal 530-1. It is appreciated that by reading out the output signals 528-G2, 528-G0, 528-G7, and 528-G5 simultaneously, vertical binning is realized in accordance with the teachings of the present invention. In addition, by reading out all four output signals 528-G2, 528-G0, 528-G7, and 528-G5 simultaneously in a single row readout period, fewer row readout periods are required, which improves speed and power consumption in accordance with the teachings of the present invention. Therefore, it is appreciated that all four of the pixel circuits coupled to bitline BL1 512-1 may be read out in a single row readout period during a low power binning mode readout of the pixel array.

As will be described in greater detail below, in addition to the vertical binning provided by reading out the output signals 528-G2, 528-G0, 528-G7, and 528-G5 simultaneously from second bitline BL1 512-1, in one embodiment, additional horizontal binning may be further achieved during the same row readout period by reading out the four other infrared signals (e.g., 528-G6, 528-G4, 528-G3, and 528-G1) at the same time, which are coupled to fourth bitline BL3 512-3, which will be discussed below in FIG. 5D. In the example, both the second bitline BL1 512-1 and fourth bitline BL3 512-3 are coupled to the input of the same analog to digital converter through a bitline switching circuit in accordance with the teachings of the present invention. As such, all eight green (G) signals can be vertically binned and horizontally binned simultaneously, and read out in the same row readout period in accordance with the teachings of the present invention.

Figure 5C:
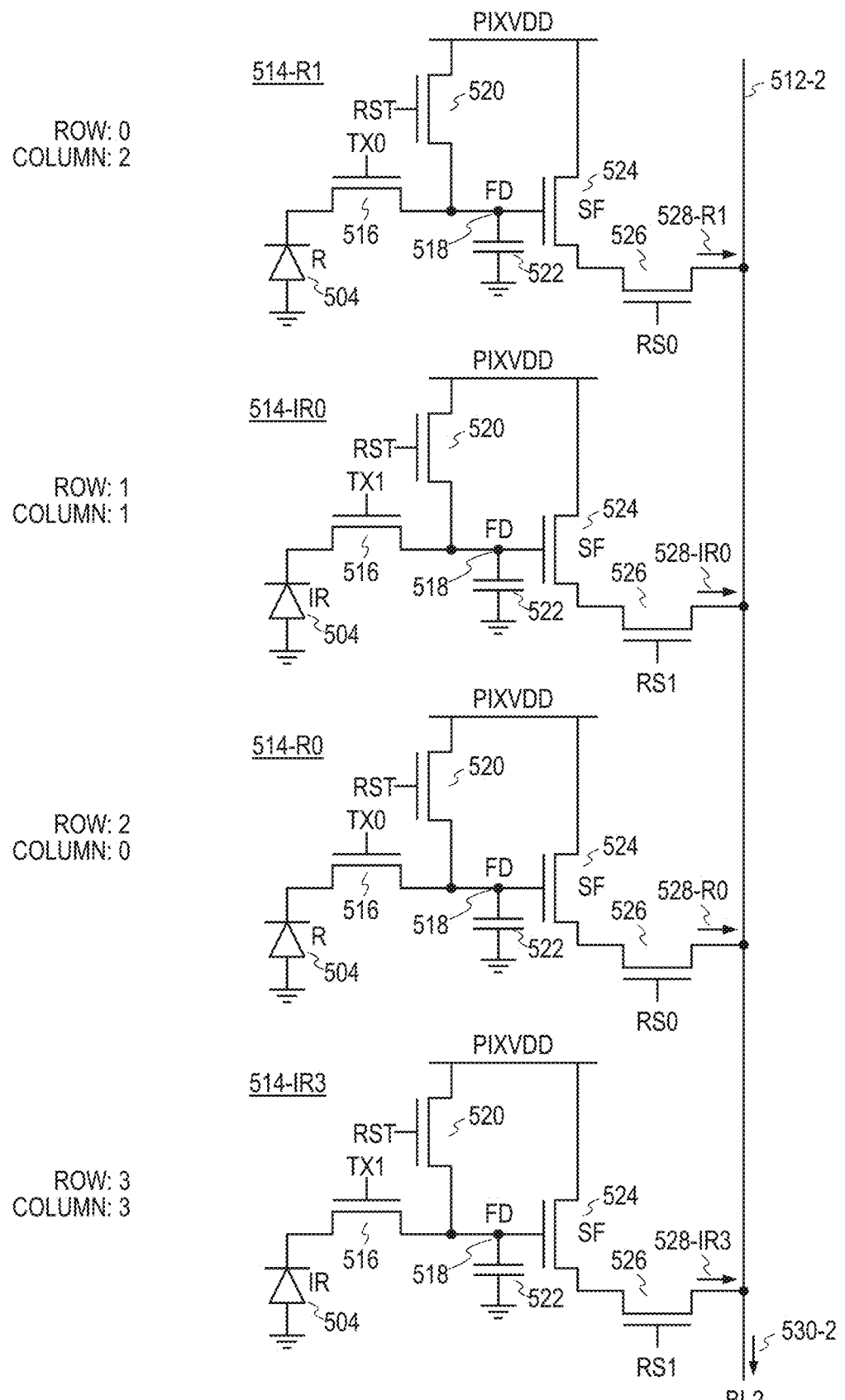
FIG. 5C illustrates one example of a third bitline coupled to four pixel circuits of a 4×4 grouping of pixel circuits coupled to four bitlines included in one example of a pixel array including color and infrared pixels coupled to a readout circuit with a low power binning readout mode in accordance with the teachings of the present invention.

Referring now specifically to the example depicted in FIG. 5C, third bitline BL2 512-2 is coupled to the pixel circuit 514-R1 of row 0 column 2, which is configured to be illuminated with red (R) light through a red (R) color filter, pixel circuit 514-IR0 of row 1 column 1, which is configured to be illuminated with infrared (IR) light through an infrared (IR) color filter, pixel circuit 514-R0 of row 2 column 0, which is configured to be illuminated with red (R) light through a red (R) color filter, and pixel circuit 514-IR3, which is configured to be illuminated with infrared (IR) light through an infrared (IR) color filter. Therefore, it is appreciated that third bitline BL2 512-2 is coupled to four pixel circuits, two of which are illuminated with red (R) light and two of which are illuminated with infrared (IR) light.

In one example, during a full resolution mode readout of the pixel array, output signal 528-R1 may be read out from pixel circuit 514-R1 of row 0 column 2 through bitline BL2 512-2 via total output signal 530-2 during a first row readout period. During a second row readout period of the full resolution readout, output signal 528-IR0 may be read out from pixel circuit 514-IR0 of row 1 column 1 through bitline BL2 512-2 via total output signal 530-2. During a third row readout period of the full resolution readout, output signal 528-R0 may be read out from pixel circuit 514-R0 of row 2 column 0 through bitline BL2 512-2 via total output signal 530-2. During a fourth row readout period of the full resolution readout, output signal 528-IR3 may be read out from pixel circuit 514-IR3 of row 3 column 3 through bitline BL2 512-2 via total output signal 530-2. Therefore, it is appreciated that all four of the pixel circuits coupled to bitline BL2 512-2 may be read out in four row readout periods during a full resolution mode readout of the pixel array.

In one example, during a low power binning mode readout of the pixel array, output signal 528-R1 from pixel circuit 514-R1 of row 0 column 2 and output signal 528-R0 from pixel circuit 514-R0 of row 2 column 0 may be read out simultaneously through bitline BL2 512-2 via total output signal 530-2 during a first row readout period. As such, both red (R) signals 528-R1 and 528-R0 can be combined or binned and read out in the same row readout period via total output signal 530-2. It is appreciated that by reading out the output signals 528-R1 and 528-R0 simultaneously, vertical binning is realized in accordance with the teachings of the present invention. In addition, by reading out both output signals 528-R1 and 528-R0 simultaneously in one row readout period, fewer row readout periods are required, which improves speed and power consumption in accordance with the teachings of the present invention. Continuing with the example, during a second row readout period of the low power binning mode readout of the pixel array, output signal 528-IR0 from pixel circuit 514-IR0 of row 1 column 1 and output signal 528-IR3 from pixel circuit 514-IR3 of row 3 column 3 may be read out simultaneously through bitline BL2 512-2 via total output signal 530-2. Therefore, it is appreciated that all four of the pixel circuits coupled to bitline BL2 512-2 may be read out in two row readout periods during a low power binning mode readout of the pixel array.

As mentioned above, in addition to the vertical binning provided by reading out the output signals 528-IR0 and 528-IR3 simultaneously from third bitline BL2 512-2, in one embodiment, additional horizontal binning may be further achieved during the second row readout period by reading out the two other infrared signals (e.g., 528-IR2 and 528-IR1) at the same, which are coupled to first bitline BL0 512-0 as discussed above in FIG. 5A. In the example, both the first bitline BL0 512-0 and third bitline BL2 512-2 are coupled to the input of the same analog to digital converter through a bitline switching circuit in accordance with the teachings of the present invention. As such, all four infrared (IR) signals can be vertically binned and horizontally binned simultaneously, and read out in the same row readout period in accordance with the teachings of the present invention.

Figure 5D:
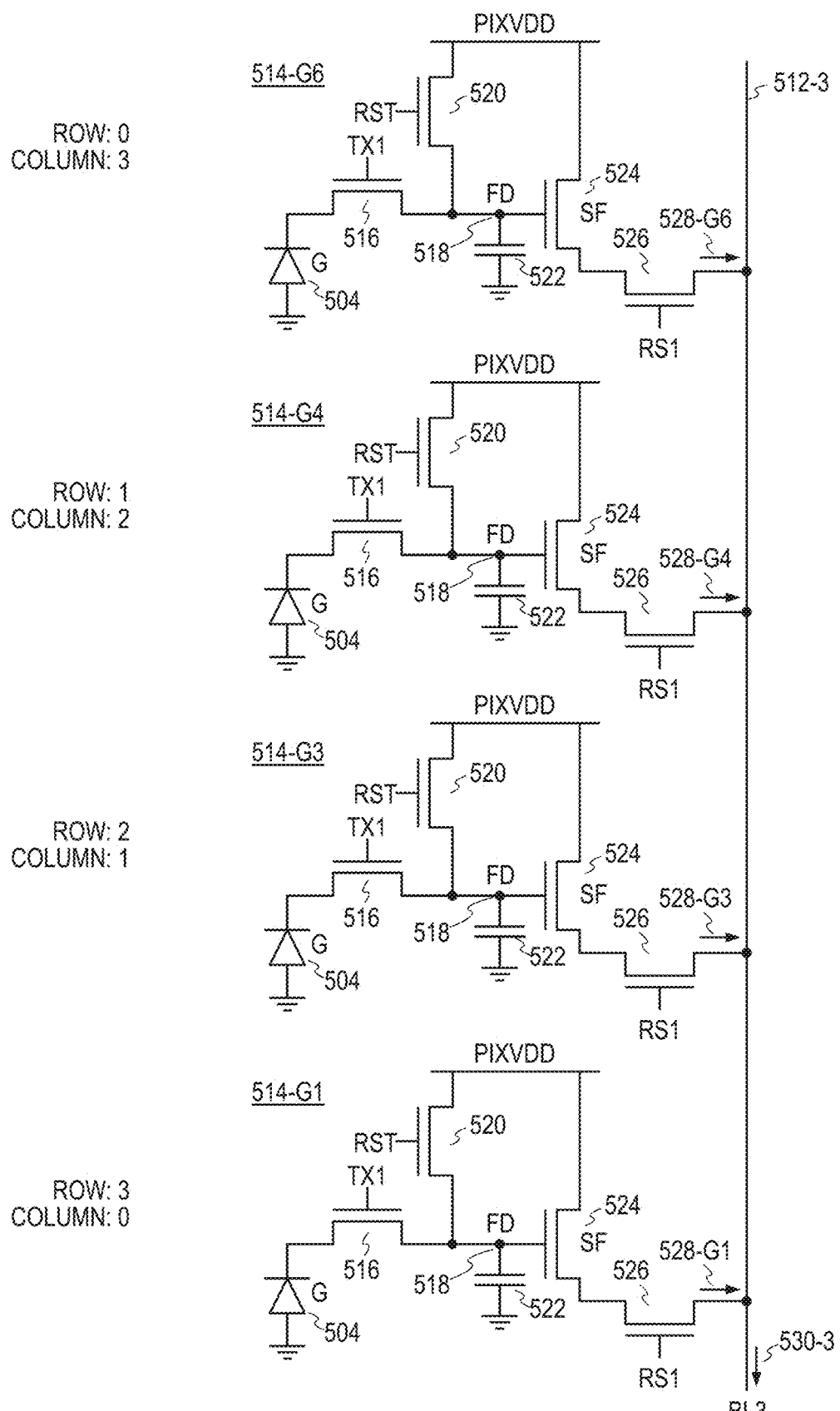
FIG. 5D illustrates one example of a fourth bitline coupled to four pixel circuits of a 4×4 grouping of pixel circuits coupled to four bitlines included in one example of a pixel array including color and infrared pixels coupled to a readout circuit with a low power binning readout mode in accordance with the teachings of the present invention.

Referring now specifically to the example depicted in FIG. 5D, fourth bitline BL3 512-3 is coupled to the pixel circuit 514-G6 of row 0 column 3, which is configured to be illuminated with green (G) light through a green (G) color filter, pixel circuit 514-G4 of row 1 column 2, which is configured to be illuminated with green (G) light through an green (G) color filter, pixel circuit 514-G3 of row 2 column 1, which is configured to be illuminated with green (G) light through a green (G) color filter, and pixel circuit 514-G1, which is configured to be illuminated with green (G) light through a green (G) color filter. Therefore, it is appreciated that fourth bitline BL3 512-3 is coupled to four pixel circuits, all four of which are illuminated with green (G) light.

In one example, during a full resolution mode readout of the pixel array, output signal 528-G6 may be read out from pixel circuit 514-G6 of row 0 column 3 through bitline BL1 512-3 via total output signal 530-3 during a first row readout period. During a second row readout period of the full resolution readout, output signal 528-G4 may be read out from pixel circuit 514-G4 of row 1 column 2 through bitline BL3 512-3 via total output signal 530-3. During a third row readout period of the full resolution readout, output signal 528-G3 may be read out from pixel circuit 514-G3 of row 2 column 1 through bitline BL3 512-3 via total output signal 530-3. During a fourth row readout period of the full resolution readout, output signal 528-G1 may be read out from pixel circuit 514-G1 of row 3 column 0 through bitline BL3 512-3 via total output signal 530-3. Therefore, it is appreciated that all four of the pixel circuits coupled to bitline BL3 512-3 may be read out in four row readout periods during a full resolution mode readout of the pixel array.

In one example, during a low power binning mode readout of the pixel array, output signal 528-G6 from pixel circuit 514-G6 of row 0 column 3, output signal 528-G4 from pixel circuit 514-G4 of row 1 column 2, output signal 528-G3 from pixel circuit 514-G3 of row 2 column 1, and output signal 528-G1 from pixel circuit 514-G1 of row 3 column 0 may be read out simultaneously through bitline BL3 512-3 via total output signal 530-3 during a single row readout period. As such, all four green (G) signals 528-G6, 528-G4, 528-G3, and 528-G1 that are coupled to bitline BL3 512-3 can be combined or binned and read out in the same row readout period via total output signal 530-3. It is appreciated that by reading out the output signals 528-G6, 528-G4, 528-G3, and 528-G1 simultaneously, vertical binning is realized in accordance with the teachings of the present invention. In addition, by reading out all four output signals 528-G6, 528-G4, 528-G3, and 528-G1 simultaneously in a single row readout period, fewer row readout periods are required, which improves speed and power consumption in accordance with the teachings of the present invention. Therefore, it is appreciated that all four of the pixel circuits coupled to bitline BL3 512-3 may be read out in a single row readout period during a low power binning mode readout of the pixel array.

As mentioned above, in addition to the vertical binning provided by reading out the output signals 528-G6, 528-G4, 528-G3, and 528-G1 simultaneously from fourth bitline BL3 512-3, additional horizontal binning may be further achieved during the same row readout period by reading out the four other infrared signals (e.g., 528-G2, 528-G0, 528-G7, and 528-G5) at the same time, which are coupled to second bitline BL1 512-1 as discussed above in FIG. 5B. In the example, both the second bitline BL1 512-1 and fourth bitline BL2 512-3 are coupled to the input of the same analog to digital converter through a bitline switching circuit in accordance with the teachings of the present invention. As such, all eight green (G) signals can be vertically binned and horizontally binned simultaneously, and read out in the same row readout period in accordance with the teachings of the present invention.

FIGS. 6A-6D illustrate an example of the bitline switching circuit 632 and analog to digital converters (ADCs) ADC0 634-0 to ADC3 634-3 included in a readout circuit coupled to four bitlines BL0 612-0 to BL3 612-3 during a full resolution mode readout in accordance with the teachings of the present invention. It is appreciated that the readout circuit including example bitline switching circuit 632 and analog to digital converters (ADCs) ADC0 634-0 to ADC3 634-3 illustrated in FIGS. 6A-6D may be an example of the readout circuit 106 illustrated in FIG. 1, and that similarly named and numbered elements described above are coupled and function similarly below. It is further appreciated that the example bitlines BL0 612-0 to BL3 612-3 referred to in FIGS. 6A-6D may be examples of bitlines BL0 412-0 to BL3 412-3 referred to in FIG. 4, or bitlines BL0 512-0 to BL3 512-3 referred to in FIGS. 5A-5D, and that similarly named and numbered elements described above are coupled and function similarly below.

TABLE 1 below summarizes an example of four row readout periods (RRP) that are utilized to perform a full resolution mode readout of a 4×4 grouping of pixel circuits, which are further illustrated in FIGS. 6A-6D below in accordance with the teachings of the present invention.

TABLE 1

| RRP | 0 | 1 | 2 | 3 |
|---|---|---|---|---|
| Row | 0 | 1 | 2 | 3 |
| TX | 0, 1 | 1 | 0, 1 | 1 |
| RS | 0, 1 | 1 | 0, 1 | 1 |
| ADC0 | BL0: B | BL2: IR | BL2: R | BL0: IR |
| ADC1 | BL1: G | BL1: G | BL3: G | BL3: G |
| ADC2 | BL2: R | BL0: IR | BL0: B | BL2: IR |
| ADC3 | BL3: G | BL3: G | BL1: G | BL1: G |

As summarized in TABLE 1 above, during the first row readout period (e.g., RRP 0), row 0 is read out, the TX0 and TX1 signals (see, e.g., FIGS. 5A-5D) are asserted for row 0, the RS0 and RS1 signals (see, e.g., FIGS. 5A-5D) are asserted for row 0, ADC0 digitizes a blue (B) signal from BL0, ADC1 digitizes a green (G) signal from BL1, ADC2 digitizes a red (R) signal from BL2, and ADC3 digitizes a green (G) signal from BL3.

During the second row readout period (e.g., RRP 1), row 1 is read out, the TX1 signal (see, e.g., FIGS. 5A-5D) is asserted for row 1, the RS1 signal (see, e.g., FIGS. 5A-5D) is asserted for row 1, ADC0 digitizes an infrared (IR) signal from BL2, ADC1 digitizes a green (G) signal from BL1, ADC2 digitizes an infrared (IR) signal from BL0, and ADC3 digitizes a green (G) signal from BL3.

During the third row readout period (e.g., RRP 2), row 2 is read out, the TX0 and TX1 signals (see, e.g., FIGS. 5A-5D) are asserted for row 2, the RS0 and RS1 signals (see, e.g., FIGS. 5A-5D) are asserted for row 2, ADC0 digitizes a red (R) signal from BL2, ADC1 digitizes a green (G) signal from BL3, ADC2 digitizes a blue (B) signal from BL0, and ADC3 digitizes a green (G) signal from BL1.

During the fourth row readout period (e.g., RRP 3), row 3 is read out, the TX1 signal (see, e.g., FIGS. 5A-5D) is asserted for row 3, the RS signal (see, e.g., FIGS. 5A-5D) is asserted for row 3, ADC0 digitizes an infrared (IR) signal from BL0, ADC1 digitizes a green (G) signal from BL3, ADC2 digitizes an infrared (IR) signal from BL2, and ADC3 digitizes a green (G) signal from BL1.

Figure 6A:
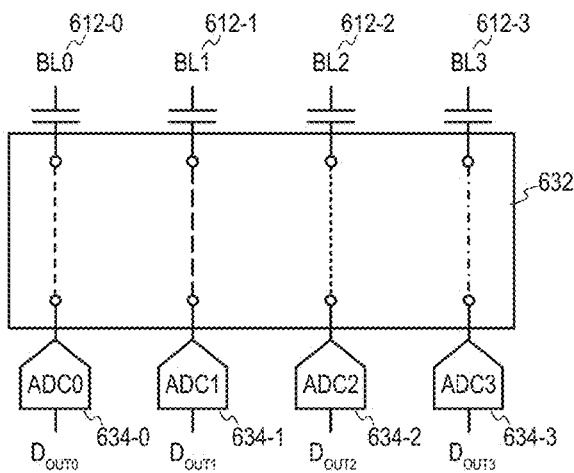
FIG. 6A illustrates one example of a first row readout period of an example bitline switching circuit and analog to digital converters coupled to four bitlines that are coupled to a 4×4 grouping of pixel circuits included in one example of a pixel array during a full resolution mode readout in accordance with the teachings of the present invention.

To illustrate, referring specifically now to the example depicted in FIG. 6A, bitline switching circuit 632 is configured to couple first bitline BL0 612-0 to ADC0 634-0 to output a digital Douro, second bitline BL1 612-1 to ADC1 634-1 to output a digital $D_{OUT1}$, third bitline BL2 612-2 to ADC2 634-2 to output a digital $D_{OUT2}$, and fourth bitline BL3 612-3 to ADC3 634-3 to output a digital $D_{OUT3}$. In one example, the couplings provided by bitline switching circuit 632 as illustrated in FIG. 6A between bitlines BL0 612-0 to BL3 612-3 and analog to digital converters ADC0 634-0 to ADC3 634-3 may be configured during a first row readout period during a full resolution mode readout of the pixel array. As such, ADC0 634-0 is configured to digitize a blue (B) signal from first bitline BL0 612-0, ADC1 634-1 is configured to digitize a green (G) signal from second bitline BL1 612-1, ADC2 634-2 is configured to digitize a red (R) signal from third bitline BL2 612-2, and ADC3 634-3 is configured to digitize a green (G) signal from fourth bitline BL3 612-3 during the first row readout period during a full resolution mode readout of the pixel array.

Figure 6B:
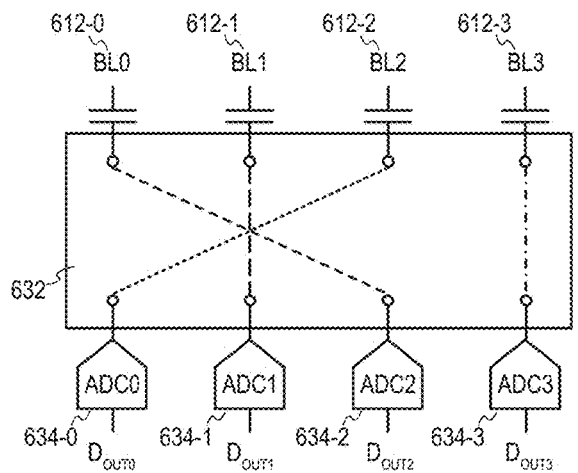
FIG. 6B illustrates one example of a second row readout period of an example bitline switching circuit and analog to digital converters coupled to four bitlines that are coupled to a 4×4 grouping of pixel circuits included in one example of a pixel array during a full resolution mode readout in accordance with the teachings of the present invention.

Referring specifically now to the example depicted in FIG. 6B, bitline switching circuit 632 is configured to couple first bitline BL0 612-0 to ADC2 634-2 to output a digital $D_{OUT2}$, second bitline BL1 612-1 to ADC1 634-1 to output a digital $D_{OUT1}$, third bitline BL2 612-2 to ADC0 634-0 to output a digital Douro, and fourth bitline BL3 612-3 to ADC3 634-3 to output a digital $D_{OUT3}$. In one example, the couplings provided by bitline switching circuit 632 as illustrated in FIG. 6B between bitlines BL0 612-0 to BL3 612-3 and analog to digital converters ADC0 634-0 to ADC3 634-3 may be configured during a second row readout period during a full resolution mode readout of the pixel array. As such, ADC0 634-0 is configured to digitize an infrared (IR) signal from third bitline BL2 612-2, ADC1 634-1 is configured to digitize a green (G) signal from second bitline BL1 612-1, ADC2 634-2 is configured to digitize an infrared (IR) signal from first bitline BL0 612-0, and ADC3 634-3 is configured to digitize a green (G) signal from fourth bitline BL3 612-3 during the second row readout period during a full resolution mode readout of the pixel array.

Figure 6C:
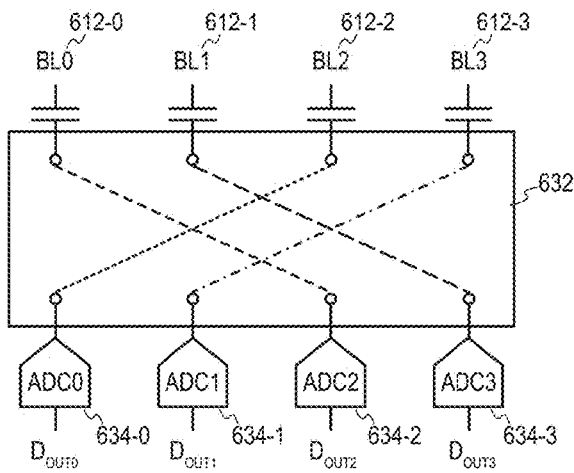
FIG. 6C illustrates one example of a third row readout period of an example bitline switching circuit and analog to digital converters coupled to four bitlines that are coupled to a 4×4 grouping of pixel circuits included in one example of a pixel array during a full resolution mode readout in accordance with the teachings of the present invention.

Referring specifically now to the example depicted in FIG. 6C, bitline switching circuit 632 is configured to couple first bitline BL0 612-0 to ADC2 634-2 to output a digital $D_{OUT2}$, second bitline BL1 612-1 to ADC3 634-3 to output a digital $D_{OUT3}$, third bitline BL2 612-2 to ADC0 634-0 to output a digital Douro, and fourth bitline BL3 612-3 to ADC1 634-1 to output a digital $D_{OUT1}$. In one example, the couplings provided by bitline switching circuit 632 as illustrated in FIG. 6C between bitlines BL0 612-0 to BL3 612-3 and analog to digital converters ADC0 634-0 to ADC3 634-3 may be configured during a third row readout period during a full resolution mode readout of the pixel array. As such, ADC0 634-0 is configured to digitize a red (R) signal from third bitline BL2 612-2, ADC1 634-1 is configured to digitize a green (G) signal from fourth bitline BL3 612-3, ADC2 634-2 is configured to digitize a blue (B) signal from first bitline BL0 612-0, and ADC3 634-3 is configured to digitize a green (G) signal from second bitline BL1 612-1 during the third row readout period during a full resolution mode readout of the pixel array.

Figure 6D:
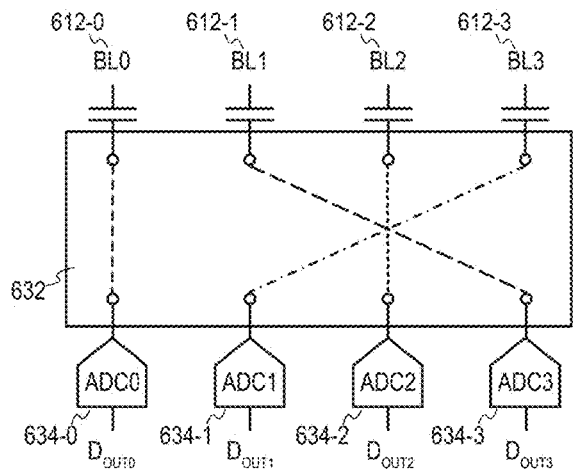
FIG. 6D illustrates one example of a fourth row readout period of an example bitline switching circuit and analog to digital converters coupled to four bitlines that are coupled to a 4×4 grouping of pixel circuits included in one example of a pixel array during a full resolution mode readout in accordance with the teachings of the present invention.

Referring specifically now to the example depicted in FIG. 6D, bitline switching circuit 632 is configured to couple first bitline BL0 612-0 to ADC0 634-0 to output a digital $D_{OUT0}$, second bitline BL1 612-1 to ADC3 634-3 to output a digital $D_{OUT3}$, third bitline BL2 612-2 to ADC2 634-2 to output a digital $D_{OUT2}$, and fourth bitline BL3 612-3 to ADC1 634-1 to output a digital $D_{OUT1}$. In one example, the couplings provided by bitline switching circuit 632 as illustrated in FIG. 6D between bitlines BL0 612-0 to BL3 612-3 and analog to digital converters ADC0 634-0 to ADC3 634-3 may be configured during a fourth row readout period during a full resolution mode readout of the pixel array. As such, ADC0 634-0 is configured to digitize an infrared (IR) signal from first bitline BL0 612-0, ADC1 634-1 is configured to digitize a green (G) signal from fourth bitline BL3 612-3, ADC2 634-2 is configured to digitize an infrared (IR) signal from third bitline BL2 612-2, and ADC3 634-3 is configured to digitize a green (G) signal from second bitline BL1 612-1 during the fourth row readout period during a full resolution mode readout of the pixel array.

It is noted that the coupling schemes illustrated in FIGS. 6A-6D for bitline switching circuit 632 for the four row readout periods of the full resolution mode readouts are provided for explanation purposes and that other coupling schemes for the four row readout periods may be utilized in accordance with the teachings of the present invention. It is further noted that in the coupling schemes illustrated in FIGS. 6A-6D for bitline switching circuit 632, the green (G) channel data is always generated by odd numbered analog to digital converters (e.g., ADC1 634-1 or ADC3 634-3).

Figure 7A:
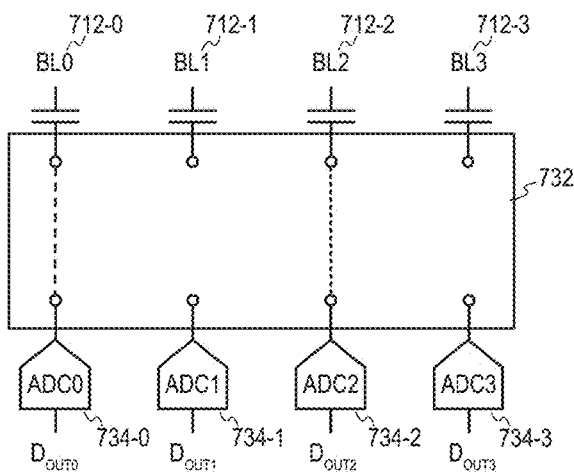
FIG. 7A illustrates one example of a first row readout period of an example bitline switching circuit and analog to digital converters coupled to four bitlines that are coupled to a 4×4 grouping of pixel circuits included in one example of a pixel array during a low power binning mode readout in accordance with the teachings of the present invention.
Figure 7B:
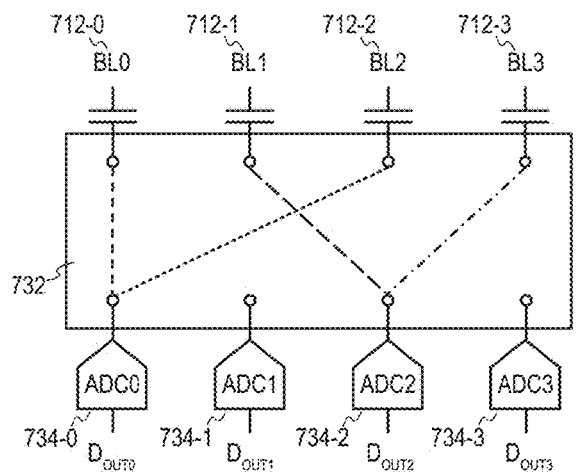
FIG. 7B illustrates one example of a second row readout period of an example bitline switching circuit and analog to digital converters coupled to four bitlines that are coupled to a 4×4 grouping of pixel circuits included in one example of a pixel array during a low power binning mode readout in accordance with the teachings of the present invention.

FIGS. 7A-7B illustrate an example of the bitline switching circuit 732 and analog to digital converters (ADCs) ADC0 734-0 to ADC3 734-3 included in a readout circuit coupled to four bitlines BL0 712-0 to BL3 712-3 during a low power binning mode readout in accordance with the teachings of the present invention. It is appreciated that the readout circuit including example bitline switching circuit 732 and analog to digital converters (ADCs) ADC0 734-0 to ADC3 734-3 illustrated in FIGS. 7A-7B may be an example of the readout circuit 106 illustrated in FIG. 1, and that similarly named and numbered elements described above are coupled and function similarly below. It is further appreciated that the example bitlines BL0 712-0 to BL3 712-3 referred to in FIGS. 7A-7B may be examples of bitlines BL0 412-0 to BL3 412-3 referred to in FIG. 4, or bitlines BL0 512-0 to BL3 512-3 referred to in FIGS.

5A-5D, and that similarly named and numbered elements described above are coupled and function similarly below.

TABLE 2 below summarizes an example of two row readout periods (RRP) that are utilized to perform a low power binning mode readout of a 4×4 grouping of pixel circuits, which are further illustrated in FIGS. 7A-7B below in accordance with the teachings of the present invention.

TABLE 2

| RRP | 0 | 1 |
|---|---|---|
| Row | 0, 2 | 0, 1, 2, 3 |
| TX | 0 | 1 |
| RS | 0 | 1 |
| ADC0 | BL0: B | (BL0 + BL2)/2: IR |
| ADC1 | powered down | powered down |
| ADC2 | BL2: R | (BL1 + BL3)/2: G |
| ADC3 | powered down | powered down |

As summarized in TABLE 2 above, the 4×4 grouping of pixel circuits is read out in two row readout periods in a low power binning mode readout instead of four row readout periods, which reduces power consumption. In addition, both ADC1 and ADC3 are powered down during the during both readout periods, which further reduces power consumption.

During the first row readout period (e.g., RRP 0), row 0 and row 2 are read out, the TX0 signal (see, e.g., FIGS. 5A-5D) is asserted for rows 0 and 2 for BL0 and BL2. The RS0 signal (see, e.g., FIGS. 5A-5D) is asserted for rows 0 and 2 for BL0 and BL2. ADC0 digitizes a vertically binned blue (B) signal from BL0, ADC1 is powered down, ADC2 digitizes a vertically binned red (R) signal from BL2, and ADC3 is powered down.

During the second row readout period (e.g., RRP 1), rows 0-3 are read out, the TX1 signal (see, e.g., FIGS. 5A-5D) is asserted for rows 0-3 for BL1 and BL3, and for rows 1 and 3 for BL0 and BL2. The RS1 signal (see, e.g., FIGS. 5A-5D) is asserted for rows 0-3 for BL1 and BL3, and for rows 1 and 3 for BL0 and BL2. ADC0 is coupled to both BL0 and BL2, which results in the average of BL0 and BL2 being digitized to produce a vertically and horizontally binned infrared (IR) signal from BL0 and BL2, ADC1 is powered down, ADC2 is coupled to both BL1 and BL3, which results in the average of BL1 and BL3 being digitized to produce a vertically and horizontally binned green (G) signal from BL1 and BL3, and ADC3 digitizes a green (G) signal from BL3.

To illustrate, referring specifically to the example depicted in FIG. 7A, bitline switching circuit 732 is configured to couple first bitline BL0 712-0 to ADC0 734-0 to output a digital Douro and third bitline BL2 712-2 to ADC2 734-2 to output a digital $D_{OUT2}$ during the first row readout period of a low power binning mode readout of the 4×4 grouping of pixel circuits. In the example, during this first row readout period, ADC1 734-1 and ADC 734-3 are powered down. In one example, bitline switching circuit 732 may also be optionally configured to decouple second bitline BL1 712-1, fourth bitline BL3 712-3, ADC1 734-1, and ADC3 734-3 as shown. Accordingly, with ADC1 734-1 and ADC 734-3 powered down, further power is saved during the low power binning mode readout. As such, ADC0 734-0 is configured to digitize a binned blue (B) signal from first bitline BL0 712-0 and ADC2 734-2 is configured to digitize a binned red (R) signal from third bitline BL2 712-2, while ADC1 734-1 and ADC 734-3 are powered down during the first row readout period during a low power binning mode readout of the pixel array.

Referring specifically to the example depicted in FIG. 7B, bitline switching circuit 732 is configured to couple both first bitline BL0 712-0 and third bitline BL2 712-2 to ADC0 734-0 to output a digital Douro and both second bitline BL1 712-1 and fourth bitline BL3 712-3 to ADC2 734-2 to output a digital $D_{OUT2}$ during the second row readout period of a low power binning mode readout of the 4×4 grouping of pixel circuits. In the example, during this second row readout period ADC1 734-1 and ADC 734-3 are powered down. In one example, bitline switching circuit 732 may also be optionally configured to decouple ADC1 734-1 and ADC3 734-3 as shown. Accordingly, with ADC1 734-1 and ADC 734-3 powered down, further power is saved during the low power binning mode readout. As such, ADC0 734-0 is configured to digitize a binned infrared (IR) signal from first bitline BL0 712-0 and third bitline BL2 712-2, while ADC2 734-2 is configured to digitize a binned green (G) signal from second bitline BL1 712-1 and fourth bitline 712-3, while ADC1 734-1 and ADC 734-3 are powered down during the second row readout period during a low power binning mode readout of the pixel array. It is appreciated that ADC0 734-0 provides horizontal binning of the infrared (IR) signals with the input of ADC0 734-0 coupled to receive first bitline BL0 712-0 and third bitline BL2 712-2, while ADC2 734-2 also provides horizontal binning of the green (G) signals with the input of ADC2 734-2 coupled to receive second bitline BL1 712-1 and fourth bitline BL3 712-3 during the second row readout period during the low power binning mode readout of the pixel array in accordance with the teachings of the present invention.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An imaging device, comprising:
a pixel array including a 4×4 grouping of pixel circuits, wherein the 4×4 grouping of pixel circuits includes four rows and four columns of the pixel array; and
a plurality of bitlines including a first bitline, a second bitline, a third bitline, and a fourth bitline, wherein each one of the first, second, third, and fourth bitlines is coupled to a respective four pixel circuits in the 4×4 grouping of pixel circuits, and wherein each one of the first, second, third, and fourth bitlines is coupled to all four of the rows and to all four of the columns of the 4×4 grouping of pixel circuits such that each of the first, second, third, and fourth bitlines is configured to receive signals simultaneously output onto that bitline from at least two pixels circuits that belong to different ones of the four rows and to different ones of the four columns, and wherein each pixel circuit of a column in the 4×4 grouping of pixel circuits is coupled to a different bitline than other pixel circuits of the same column in the 4×4 grouping of pixel circuits.

2. The imaging device of claim 1, wherein the 4×4 grouping of pixel circuits is one of a plurality of 4×4 groupings of pixel circuits included in the pixel array.

3. The imaging device of claim 1, further comprising a color filter array disposed over the pixel array, wherein the color filter array includes a 4×4 grouping of color filters disposed over the 4×4 grouping of pixel circuits.

4. The imaging device of claim 3, wherein the 4×4 grouping of color filters comprises two color filters having a first color, eight color filters having a second color, two color filters having a third color, and four color filters having a fourth color.

5. The imaging device of claim 4, wherein each one of the color filters of the 4×4 grouping of color filters is adjacent to another color filter having a different color in a same row or in a same column of the pixel array.

6. The imaging device of claim 4, wherein the first color comprises red, wherein the second color comprises green, wherein the third color comprises blue, wherein the fourth color comprises infrared.

7. The imaging device of claim 4,
wherein the respective four pixel circuits coupled to the first bitline are disposed under two color filters having the third color and two color filters having the fourth color,
wherein the respective four pixel circuits coupled to the second bitline are disposed under four color filters having the second color,
wherein the respective four pixel circuits coupled to the third bitline are disposed under two color filters having the first color and two color filters having the fourth color,
wherein the respective four pixel circuits coupled to the fourth bitline are disposed under four color filters having the second color.

8. The imaging device of claim 7, further comprising:
a bitline switching circuit coupled to the first, second, third, and fourth bitlines; and
a plurality of analog to digital converters (ADCs) coupled to the first, second, third, and fourth bitlines through the bitline switching circuit.

9. The imaging device of claim 8, wherein one pixel circuit is configured to be read out at a time through respective first, second, third, and fourth bitlines during a readout period during a full resolution mode readout of the pixel array.

10. The imaging device of claim 9, wherein all pixel circuits of the 4×4 grouping of pixel circuits are configured to be read out through the first, second, third and fourth bitlines after four readout periods during the full resolution mode readout of the pixel array.

11. The imaging device of claim 10, wherein the plurality ADCs includes a first ADC, a second ADC, a third ADC, and a fourth ADC.

12. The imaging device of claim 11, wherein the bitline switching circuit is configured to change couplings between the first, second, third, and fourth ADCs and the first, second, third, and fourth bitlines between each readout period of the four readout periods during the full resolution mode readout of the pixel array.

13. The imaging device of claim 8, wherein a plurality of pixel circuits disposed under color filters having a same color are configured to read out simultaneously through respective first, second, third, and fourth bitlines during a readout period during a binning mode readout of the pixel array.

14. The imaging device of claim 13, wherein all pixel circuits of the 4×4 grouping of pixel circuits are configured to be read out through the first, second, third and fourth bitlines after two readout periods during the binning mode readout of the pixel array.

15. The imaging device of claim 14, wherein the plurality ADCs includes a first ADC and a third ADC.

16. The imaging device of claim 15,
wherein the bitline switching circuit is configured to couple the first ADC to the first bitline to read out a plurality of pixel circuits disposed under color filters having the third color and the third ADC to the third bitline to read out a plurality of pixel circuit disposed under color filters having the first color during a first readout period of the two readout periods during the binning mode readout of the pixel array,
wherein the bitline switching circuit is configured to couple the first ADC to the first and third bitlines to read out a plurality of pixel circuits disposed under color filters having the fourth color and the third ADC to the second and fourth bitlines to read out a plurality of pixel circuits disposed under color filters having the second color during a second readout period of the two readout periods during the binning mode readout of the pixel array.

17. An imaging system, comprising:
a pixel array including a 4×4 grouping of pixel circuits, wherein the 4×4 grouping of pixel circuits includes four rows and four columns of the pixel array;
a plurality of bitlines including a first bitline, a second bitline, a third bitline, and a fourth bitline, wherein each one of the first, second, third, and fourth bitlines is coupled to a respective four pixel circuits in the 4×4 grouping of pixel circuits, and wherein each one of the first, second, third, and fourth bitlines is coupled to all four of the rows and to all four of the columns of the 4×4 grouping of pixel circuits such that each of the first, second, third, and fourth bitlines is configured to receive signals simultaneously output onto that bitline from at least two pixels circuits that belong to different ones of the four rows and to different ones of the four columns, and wherein each pixel circuit of a column in the 4×4 grouping of pixel circuits is coupled to a different bitline than other pixel circuits of the same column in the 4×4 grouping of pixel circuits;
a control circuit coupled to the pixel array to control operation of the pixel array; and
a readout circuit coupled to the pixel array to read out signals from the pixel array through the plurality of bitlines, wherein the readout circuit includes:
a bitline switching circuit coupled to the first, second, third, and fourth bitlines; and
a plurality of analog to digital converters (ADCs) coupled to the first, second, third, and fourth bitlines through the bitline switching circuit.

18. The imaging system of claim 17, further comprising function logic coupled to the readout circuit to store digital representations of the signals from the pixel array.

19. The imaging system of claim 17, wherein the 4×4 grouping of pixel circuits is one of a plurality of 4×4 groupings of pixel circuits included in the pixel array.

20. The imaging system of claim 17, further comprising a color filter array disposed over the pixel array, wherein the color filter array includes a 4×4 grouping of color filters disposed over the 4×4 grouping of pixel circuits.

21. The imaging system of claim 20, wherein the 4×4 grouping of color filters comprises two color filters having a first color, eight color filters having a second color, two color filters having a third color, and four color filters having a fourth color.

22. The imaging system of claim 21, wherein each one of the color filters of the 4×4 grouping of color filters is adjacent to another color filter having a different color in a same row or in a same column of the pixel array.

23. The imaging system of claim 21, wherein the first color comprises red,
wherein the second color comprises green, wherein the third color comprises blue, wherein the fourth color comprises infrared.

24. The imaging system of claim 21,
wherein the respective four pixel circuits coupled to the first bitline are disposed under two color filters having the third color and two color filters having the fourth color,
wherein the respective four pixel circuits coupled to the second bitline are disposed under four color filters having the second color,
wherein the respective four pixel circuits coupled to the third bitline are disposed under two color filters having the first color and two color filters having the fourth color,
wherein the respective four pixel circuits coupled to the fourth bitline are disposed under four color filters having the second color.

25. The imaging system of claim 24, wherein one pixel circuit is configured to be read out at a time through respective first, second, third, and fourth bitlines during a readout period during a full resolution mode readout of the pixel array.

26. The imaging system of claim 25, wherein all pixel circuits of the 4×4 grouping of pixel circuits are configured to be read out through the first, second, third and fourth bitlines after four readout periods during the full resolution mode readout of the pixel array.

27. The imaging system of claim 26, wherein the plurality ADCs includes a first ADC, a second ADC, a third ADC, and a fourth ADC.

28. The imaging system of claim 27, wherein the bitline switching circuit is configured to change couplings between the first, second, third, and fourth ADCs and the first, second, third, and fourth bitlines between each readout period of the four readout periods during the full resolution mode readout of the pixel array.

29. The imaging system of claim 24, wherein a plurality of pixel circuits disposed under color filters having a same color are configured to read out simultaneously through respective first, second, third, and fourth bitlines during a readout period during a binning mode readout of the pixel array.

30. The imaging system of claim 29, wherein all pixel circuits of the 4×4 grouping of pixel circuits are configured to be read out through the first, second, third and fourth bitlines after two readout periods during the binning mode readout of the pixel array.

31. The imaging system of claim 30, wherein the plurality ADCs includes a first ADC and a third ADC.

32. The imaging system of claim 31,
wherein the bitline switching circuit is configured to couple the first ADC to the first bitline to read out a plurality of pixel circuits disposed under color filters having the third color and the third ADC to the third bitline to read out a plurality of pixel circuit disposed under color filters having the first color during a first readout period of the two readout periods during the binning mode readout of the pixel array,
wherein the bitline switching circuit is configured to couple the first ADC to the first and third bitlines to read out a plurality of pixel circuits disposed under color filters having the fourth color and the third ADC to the second and fourth bitlines to read out a plurality of pixel circuits disposed under color filters having the second color during a second readout period of the two readout periods during the binning mode readout of the pixel array.

* * * * *